Patented Apr. 2, 1929.

1,707,470

UNITED STATES PATENT OFFICE.

HUGH KNIGHT, OF RIVERSIDE, CALIFORNIA, ASSIGNOR TO CALIFORNIA SPRAY CHEMICAL COMPANY, OF WATSONVILLE, CALIFORNIA, A CORPORATION OF CALIFORNIA.

PARASITICIDAL OIL.

No Drawing. Application filed January 19, 1927. Serial No. 162,210.

My invention relates to the insecticidal and fungicidal art and more particlularly to that section of the art which depends upon the use of phytonomic oils, that is, oils which are fatal to insects and to fungi but not injurious to healthy plants, and by use of which the economic health of plants can be regulated and promoted.

In my co-pending application Serial No. 155,558, I have described my discovery that certain organic compounds which I have called "polar" compounds may be used advantageously as oil-soluble emulsifiers and may also be so chosen as to give added effectiveness to the phytonomic oil, but have not therein claimed the process of modifying the relative phytocidal and parasiticidal action of oils to produce phytonomic oils, or claimed the products thereby produced, which are included in the subject matter of this specification.

I have discovered that in the case of certain insects the highly purified non-volatile phytonomic oils do not seem to possess any inherent toxicity, i. e. do not in the ordinary sense poison the insect. Neither do they act in a caustic or corrosive way to destroy the tissue so far as can be observed. Their action appears to be largely one of suffocation, since they appear to readily wet the waxy covering or secretion of the insect, and their low surface tension allows them to spread over the surface, enter the spiracles or breathing tubes and choke up the entire respiratory system.

I have found that in the case of some species of insects, such for example as certain scale insects and mealy-bugs, members of the family Coccidæ, it takes considerable time to thus kill by the mere deprivation of oxygen. It is for this reason, I believe, that light and moderately volatile oils have proved ineffective when used against armored scales and certain other types of insect, unless used in such frequency and quantity as to be poisonous to the plant; that is, because the oil was completely evaporated or the remaining oil film therefrom became so thin as to be ineffective, before deprivation of oxygen ultimately produced death. This may be due to the particular character of the insect, or the relatively great area of very thin film exposed which enabled the insect to get sufficient oxygen to continue an in-
hibited or dormant sort of life, similar to hibernation, by means of the oxygen dissolved in and diffused through the thin oily coating. Certain specimens of mealy-bugs have even been known to survive for ten days when completely immersed in oil.

Hitherto therefore it has been necessary to employ an oil of low volatility commonly called non-volatile so that it would not evaporate before the insect was killed. One consequence has been that in most cases an oil of high viscosity was chosen, which I believe tended to retard the quick spread and complete penetration of the oil. Another consequence has been that, incidentally, prolonged action of the oil upon the plant tissue has been required. On plants and trees that are unthrifty, diseased, suffering from mal-nutrition, or subject to water deficiency, the use of the heavy non-volatile oil may in some cases produce an undesirable physiological effect, such as reduced transpiration or clogging of the plant circulatory system or a decrease in the production of carbohydrates. One or all of these effects may become outwardly manifest by excessive leaf drop, fruit drop or delayed appearance of the normal coloring of the fruit, such as has been noticed in some cases with citrus fruit.

I have discovered that the addition of small amounts of actively poisonous substances to the oil is extraordinarily toxic to parasites and effective in reducing the time required for the oil to kill the insects. I believe this to be due to the penetrating quality of oil, the direct application thereby to the insect's circulatory system and the large absorption surface of the insect thereby exposed to the action of the poison. In some cases the amount of poison required is as small as $\frac{1}{16}$ of one percent or less of the weight of the oil used, which itself is only 3% or less of the spray, so that the spray contains only about one part of poison in 10,000 of water and oil. The simultaneous poisoning and strangling action on the parasites seems to be peculiarly fatal.

Many types of poisons may be thus applied, to wit, any poison which can be well dispersed in the oil, but preferably those which are soluble in the oil or miscible therewith. I have found that by the use of such small proportions of poison dispersed in the oil the toxic or lethal action of the oil is so greatly promoted that the required time of immersion or coating may be reduced from several days to a few minutes, sometimes apparently not more than two minutes and in other cases something like twenty minutes, owing, I believe, to the surface absorption of the poison.

I have thus devised a method of contacting these poisonous substances with the plant parasites on the one hand and on the other hand of permitting only moderately viscous, more penetrating and at the same time by increasing its parasiticidal power, more volatile oil to be used, thereby further increasing the rapidity and completeness with which the insect is subjected to the action of poison as well as enabling a wider range or "cut" of oil to be used so that the more volatile oils are rendered available either alone or in admixture with the more viscous and less volatile oil. At the same time I have decreased the time necessary to maintain the integrity of the oil coating and shortened the necessary time of exposure of the plant tissue to the action of the oil film to within the limit of plant tolerance and substantially eliminated the danger even to unhealthy plants.

In some cases the more volatile oils have a further advantage of greater solvent power for certain of the poisons to be applied. I am thus enabled to utilize certain classes of poisons by an entirely new method, i. e. dispersed within the particles of an oily "solvent" which is itself dispersed in an aqueous medium for application. I am thus enabled to use minute quantities of poison applied to the bodies of the insects with great effectiveness, and much more expensive poisonous substances can otherwise be effectively and economically applied because of the great penetration of the medium in which the poison is dispersed and consequently the great exposure of the insect and effective application of the poison. I am thus enabled to adjust the relative toxicity of an oil to parasites and the volatility of the oil to reduce its phytocidal effect thereby regulating the plant economy and producing phytonomic poisoned oils directly from oils of greater volatility or greater phytocidal impurity, or potential phytocidal matter than are safe and effective to use alone because they would injure the plant if used in sufficient quantity or with sufficient frequency to protect the plant from parasites.

The poisons which I have found most effective cover a very wide range of substances, but are generally speaking characterized by the fact that they have a high toxic value for the parasites, particularly insects, and little toxic action on plants, and may therefore be called selective poisons. They are chiefly organic substances, but the more useful poisons are those which are easily soluble or wholly miscible with the oil to be used. Strychnine, nicotine and many crystalline poisons can be dissolved or dispersed in the oil to sufficient extent. It is more convenient, however, to use such poisons as are themselves liquid and readily miscible with the oil, as for example certain of the benzene derivatives such as nitrobenzene, benzaldehyde or benzoic acid which are cheap, easily obtainable, reasonably safe to handle and readily applied in the process of making the phytonomic oil emulsion. These have been found to greatly increase the effective toxicity of the oil.

Furthermore, I have discovered that certain of them serve to act in some stimulating way upon the plant. Apparently they do not cause a decrease of transpiration, circulation or production of carbohydrates, but under favorable conditions actually seem to promote transpiration and act as plant tonics, having special phytonomic properties of their own.

One specific example of the application of certain features of my invention would be the addition of between 2½ and 5% of nitrobenzene by weight of the oil to the white oil or phytonomic oil which is to be used in any of the well-known ways used for the application of phytonomic oils to plants. For example, I may emulsify about 2% or more of this poisoned oil with water in the usual way and if desired further dilute such emulsion and apply the poison directly to the insect by the oil film produced at the plant surface by the breaking of the emulsion when the emulsion is sprayed thereon.

Another specific illustration would be the addition of from 1 to 2% of benzaldehyde directly to the ordinary white oil or partially phytonomic oil.

A third example would be the addition by warming together or other suitable means, of between one-half of one per cent and one per cent of benzoic acid in a partially purified oil sufficiently volatile to be within the limit of plant tolerance.

Another example is the addition of $\frac{1}{8}$ to $\frac{1}{16}$ of one per cent of salicylic acid to the white oil. This very greatly increases the toxicity of the oil to mealy bugs.

Some other poisons or plant tonics or both which I have found useful may be mentioned as follows: fatty acids derived from vegetable and animal oils, such as oleic acid, and acids derived from rosin oil, also acids from whale oil. Others are alkaloid-like substances derived from petroleum by acids like sulfuric and sulfonic acids, salicylicaldehyde, brombenzene, paradichlorbenzene, etc.

Furthermore, I have discovered that by the application of poisons in this way I am not only enabled to use lighter, more volatile oils having a lower viscosity and thereby to decrease the danger of injurious physiological effects upon the plant, but I am also enabled to utilize oils of less purity or stability than would otherwise be the case because of the greater volatility of the oil and briefer duration of plant exposure. For example, oils of about the volatility of kerosene may be used with some effect, but bezol or gasoline are so volatile as to leave the poison practically undiluted and unable to penetrate when the spray strikes the insect. A substantial degree of non-volatility or durability is required to maintain the dispersion and fluidity of the poison so that it may penetrate the insect and become effective, and such more or less non-volatile oils I call durable oils, and they must, of course, be substantially free from phytocidal action. Similarly the poison I use is not substantially volatile like pyrethrium but must be sufficiently stable to be carried to the insects' interior without evaporating or undergoing physical or chemical change that renders it ineffective. Thus I am enabled in certain cases to so choose the character of poison or other material administered with the oil as to partially or wholly offset any possible injurious action to the plant or even to promote the beneficial action by what I believe to be an actual stimulation of the plant metabolism whether by increased transpiration or circulation or otherwise.

While I have explained in detail the objects and methods of my invention and what I believe to be the causes of the beneficial effects I obtain thereby and have given a number of specific illustrative examples, I do not wish or intend to be limited thereby or thereto.

I claim:

1. The process of regulating plant economy which consists in killing the parasites on the plant by applying to the plants and to the parasites a durable oil free from phytocidal action containing in solution a small percentage of stable insect-poison.

2. The process of regulating plant economy which consists in killing the parasites on the plant by applying to the plants and to the parasites a durable oil free from phytocidal action containing in solution a small percentage of stable poison dispersed therein.

3. The process of regulating plant economy which consists in applying to the plants an aqueous spray containing a small percentage of a stable poison dispersed in a durable oil of greater volatility than is safe and effective in like emulsion without the poison.

4. The process of regulating plant economy which consists in applying to the plants an aqueous spray containing a small percentage of a substance poisonous to the parasites but tonic to the plant while said substance is dispersed in a durable oil free from phytocidal action.

5. The process of regulating plant economy which consists in killing the parasites on the plant by means of a small percentage of a substance poisonous to the parasites but tonic to the plant applied while said substance is dispersed in a durable oil free from phytocidal action.

6. The process of controlling plant parasites which consists in killing the parasites by surface absorption of a poison from moderately volatile oil films free from phytocidal action.

7. As a new article of manufacture, an agricultural durable-oil spray free from phytocidal action which has dispersed therein a stable poison for plant parasites.

8. As a new article of manufacture, an aqueous agricultural spray which contains a durable oil free from phytocidal action in which has been dispersed a stable poison for plant parasites.

9. As a new article of manufacture, an aqueous agricultural oil spray mixture free from phytocidal action which contains a durable oil which has dispersed therein a stable poison for plant parasites.

10. As a new article of manufacture, an agricultural spray free from phytocidal action which contains a durable oil having dispersed therein a substance which is both a poison for plant parasites and a plant tonic.

11. As a new article of manufacture, an agricultural spray which comprises an oil dispersed as an emulsion in the aqueous medium, said oil having dispersed therein a substance which is both a poison for plant parasites and a plant tonic.

12. As a new composition of matter, an insect poison dispersed in a substantially non-volatile viscous oil substantially free from phytocidal ingredients which is dispersed in water.

HUGH KNIGHT.